(12) United States Patent
Bragg

(10) Patent No.: US 9,827,665 B2
(45) Date of Patent: Nov. 28, 2017

(54) PLACEMENT AND RETRIEVAL APPARATUS

(71) Applicant: David Bragg, Moore, OK (US)

(72) Inventor: David Bragg, Moore, OK (US)

(*) Notice: Subject to any disclaimer, the term of this patent is extended or adjusted under 35 U.S.C. 154(b) by 0 days.

(21) Appl. No.: 15/415,277

(22) Filed: Jan. 25, 2017

(65) Prior Publication Data
US 2017/0259426 A1  Sep. 14, 2017

Related U.S. Application Data

(60) Provisional application No. 62/306,768, filed on Mar. 11, 2016.

(51) Int. Cl.
  *B66F 19/00*  (2006.01)
  *B25J 1/04*  (2006.01)
(52) U.S. Cl.
  CPC ...................... *B25J 1/04* (2013.01)
(58) Field of Classification Search
  CPC .... B25J 1/04; B65G 7/12; F16B 45/00; F21V 21/08
  USPC ...................... 294/24, 209; D8/14
  See application file for complete search history.

(56) References Cited

U.S. PATENT DOCUMENTS

| | | | | |
|---|---|---|---|---|
| 4,469,361 A * | 9/1984 | Pendergraft | ............. | B25B 9/00 294/175 |
| 5,964,489 A * | 10/1999 | Mahoney | ................... | B25J 1/04 248/339 |
| 6,352,291 B1 * | 3/2002 | Tortajada | .................. | F21S 4/10 294/211 |
| 6,425,614 B1 * | 7/2002 | Limber | ..................... | B25B 9/00 242/405.3 |
| 7,429,067 B1 * | 9/2008 | Rosa | ....................... | F21V 19/04 248/303 |
| 8,459,712 B2 * | 6/2013 | Thrasher | ................. | B25B 31/00 248/219.2 |
| 2012/0019018 A1 * | 1/2012 | Malaga | ................... | A47F 13/06 294/190 |

* cited by examiner

*Primary Examiner* — Stephen Vu
(74) *Attorney, Agent, or Firm* — Hall Estill Law Firm

(57) ABSTRACT

A placement and retrieval apparatus for placing and retrieving a suspension apparatus is described herein. The placement and retrieval apparatus includes a placement portion for engaging the connection apparatus to place the connection apparatus at a desired location on a support structure. The placement and retrieval apparatus also including a retrieval portion for engaging the connection apparatus to remove the connection apparatus from the support structure.

9 Claims, 6 Drawing Sheets

PLACEMENT AND RETRIEVAL APPARATUS

CROSS-REFERENCE TO RELATED APPLICATIONS

The present application is a conversion of U.S. Provisional Application having U.S. Ser. No. 62/306,768, filed Mar. 11, 2016, which claims the benefit under 35 U.S.C. 119(e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to an apparatus for efficiently placing and retrieving various objects from a ceiling, or any apparatus disposed above the ground.

2. Description of the Related Art

In standard decorative operations wherein decorative items are suspended from ceilings, the decorative items are usually attached to a suspension apparatus. The suspension apparatus can be releasably attached to a ceiling. Current devices used to place the suspension apparatuses and retrieve the suspension apparatuses have various deficiencies.

Accordingly, there is a need for a device that can place the suspension apparatuses and retrieve the suspension apparatuses more efficiently.

SUMMARY OF THE DISCLOSURE

This disclosure is directed to placement and retrieval apparatus, the apparatus comprising: a placement portion for engaging a connection apparatus to place the connection apparatus at a desired location on a support structure; and a retrieval portion for engaging the connection apparatus to remove the connection apparatus from the support structure.

DETAILED DESCRIPTION OF THE DISCLOSURE

Figure 1:
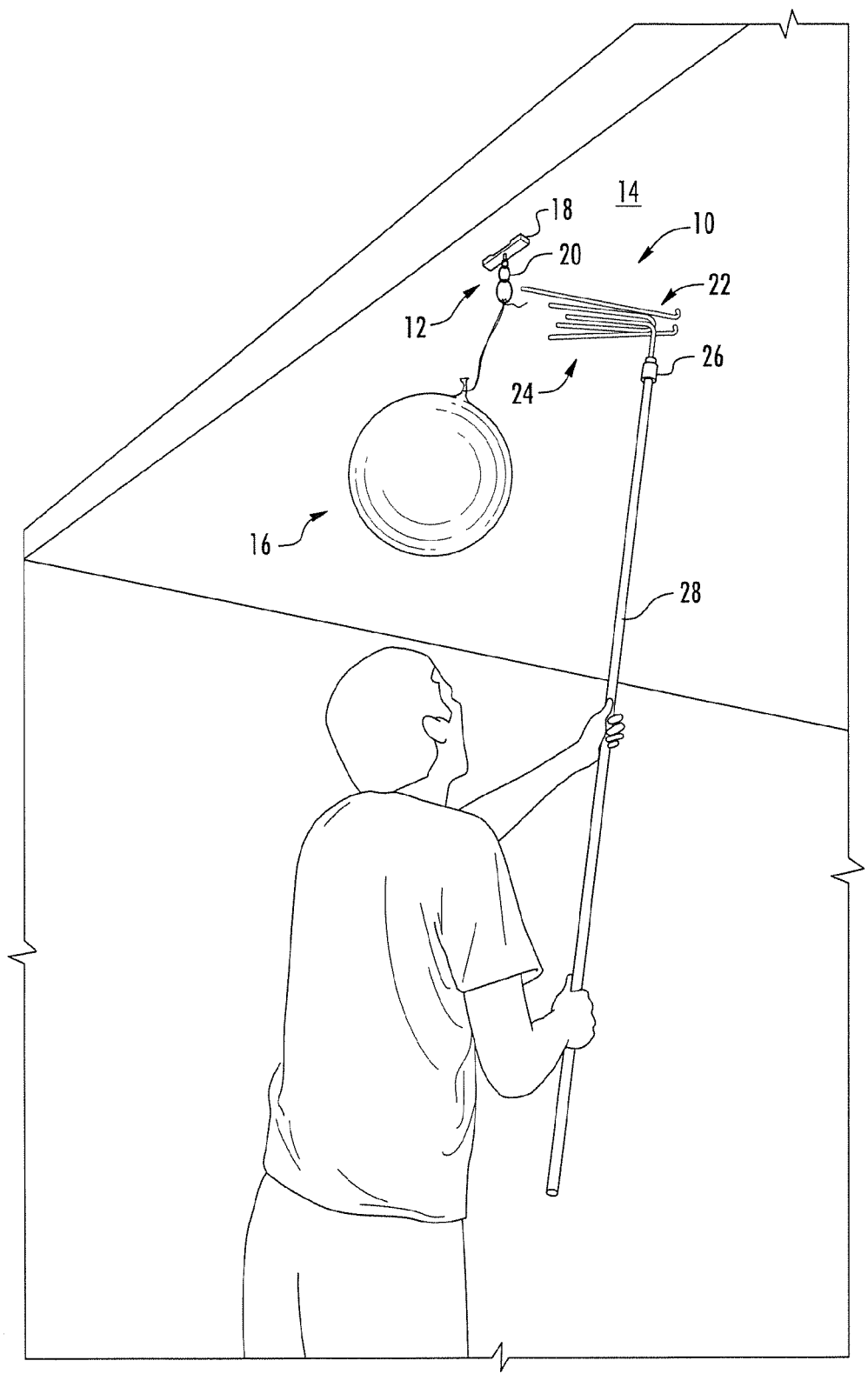
FIG. 1 is a perspective view of a placement and retrieval apparatus and a suspension apparatus in accordance with the present disclosure.
Figure 2:
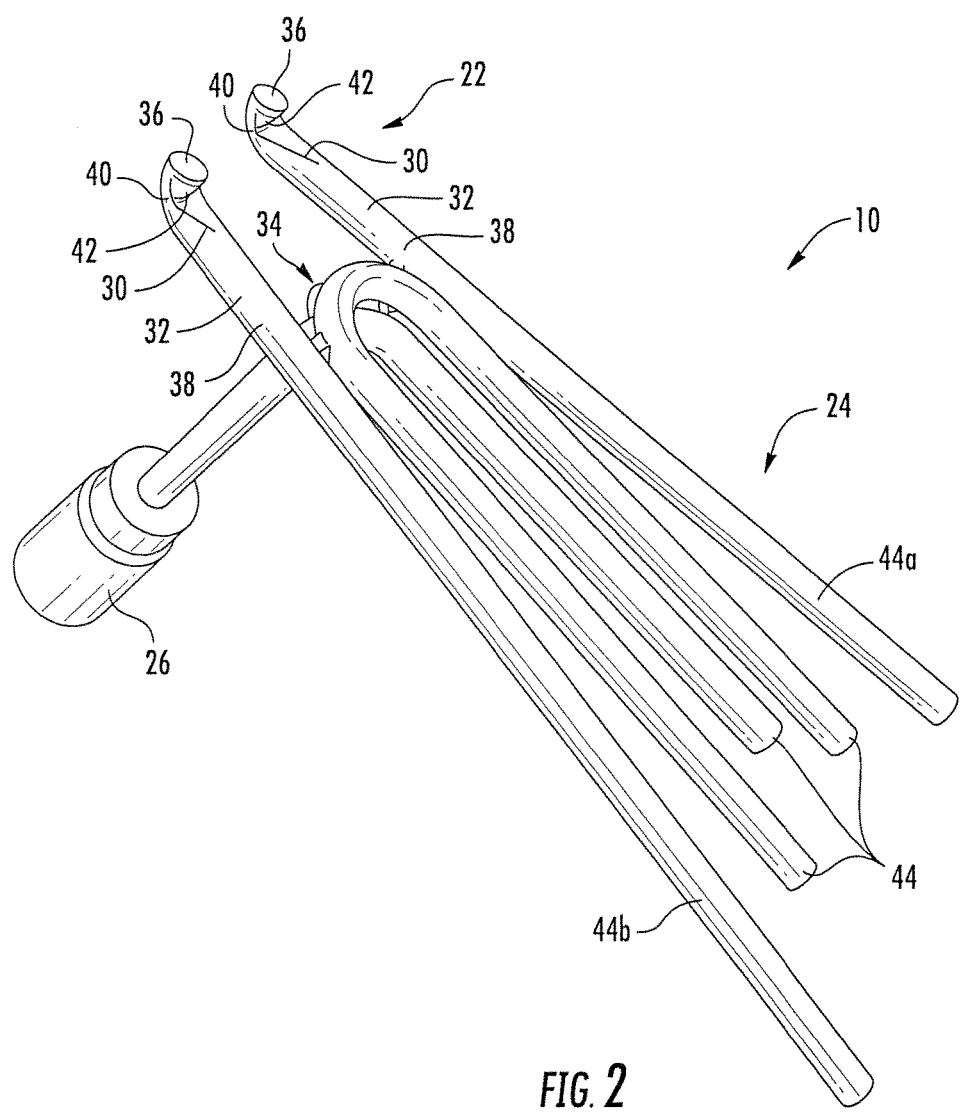
FIG. 2 is a perspective view of one embodiment of a placement and retrieval apparatus constructed in accordance with the present disclosure.
Figure 3:
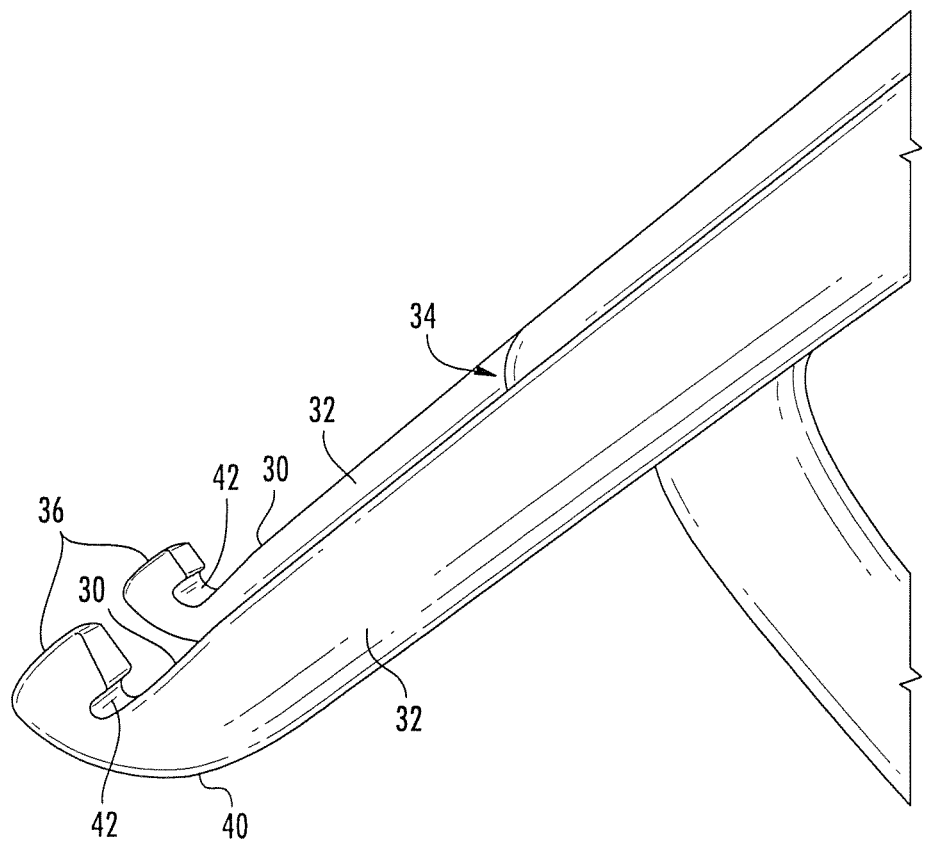
FIG. 3 is a perspective view of a portion of the placement and retrieval apparatus shown in FIG. 2 and constructed in accordance with the present disclosure.
Figure 4:
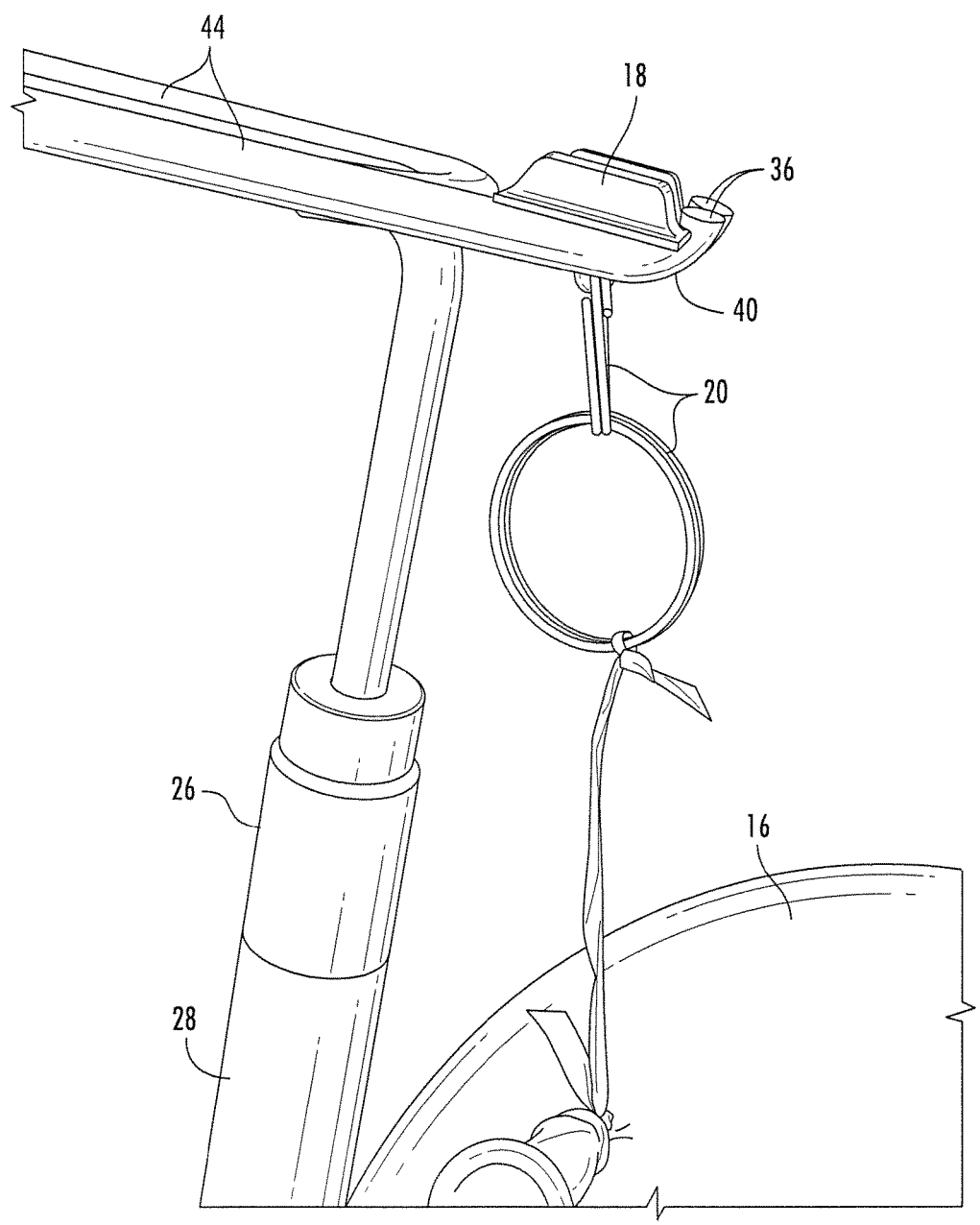
FIG. 4 is a perspective view of the portion of the placement and retrieval apparatus shown in FIG. 3 in use with the suspension apparatus and constructed in accordance with the present disclosure.
Figure 5:
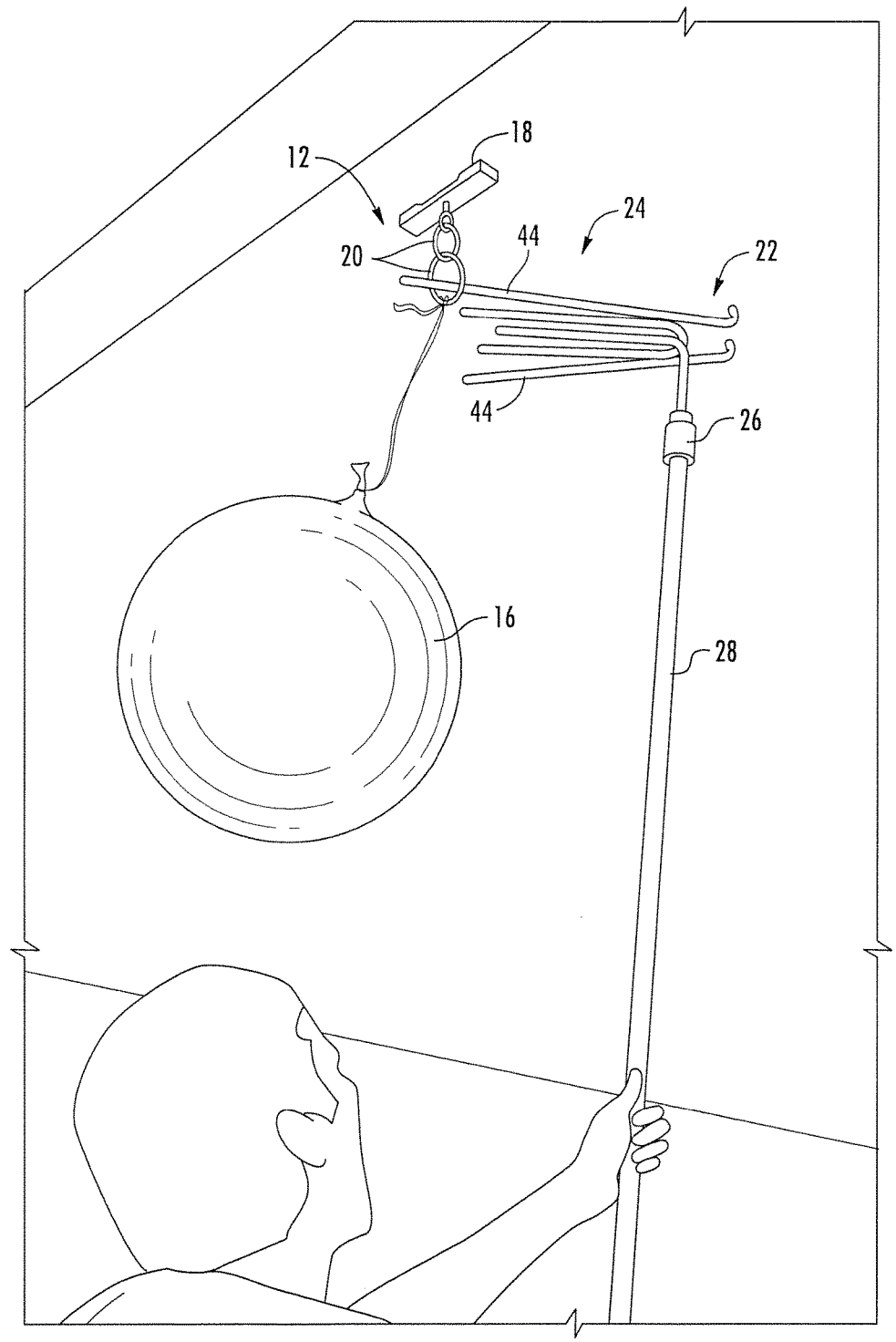
FIG. 5 a perspective view of the placement and retrieval apparatus shown in FIG. 2 in use with the suspension apparatus and constructed in accordance with the present disclosure.

The present disclosure, as shown in FIGS. 1-5, relates to a placement and retrieval apparatus 10 for placing and retrieving a suspension apparatus 12 on and from a support structure 14. A suspension apparatus 12 can be selectively supported by the support structure 14 and is used to support a decorative item 16. The support structure 14 can be any structure capable of supporting the suspension apparatus 12. Examples of support structures 14 include, but are not limited to, ceilings, walls, structures supported by ceilings, walls, and/or floors. The decorative item 16 can be a sign, balloon, and the like. The suspension apparatus 12 can have an adhesive portion 18 (such as a magnetic portion or a sticky portion) and a connection portion 20 for selective attachment to the decorative item 16. The connection portion 20 can be any device capable of being attached to the adhesive portion 18 of the suspension apparatus 12 and selectively attached to the decorative item 16. In one embodiment, the connection portion 20 can be a ring or series of rings.

The placement and retrieval apparatus 10 includes a placement portion 22, a retrieval portion 24 and an attachment element 26 for connecting the placement and retrieval apparatus 10 to a handle, pole, or some extension device 28. The placement portion 22 provides a seat 30 are for supporting the adhesive portion 18 of the suspension apparatus 12 as the placement and retrieval apparatus 10 is used to set the suspension apparatus 12 in a desired spot on the support structure 14. The retrieval portion 24 provides a mechanism for engaging the connection portion 20 of the suspension apparatus 12 when it is desirable for the suspension apparatus 12 to be removed from its place on the support structure 14.

In one embodiment, the placement portion 22 includes at least one extension element 32 that extends away from a base portion 34 of the placement and retrieval apparatus 10. The base portion 34 can be the attachment element 26 or some rod or element that extends from the attachment element 26. The extension element 32 can have an upturned end 36 that is opposite of an end 38 of the extension element 32 closest to the base portion 34. The upturned end 36 creates an elbow 40 in the extension element 32. The elbow 40 can include a slot 42 therein for receiving a portion of the adhesive portion 18 of the suspension apparatus 12. The engagement between the adhesive portion 18 of the suspension apparatus 12 and the slot 42 disposed in the elbow 40 cooperate to control the suspension apparatus 12, and thus the decorative item 16 as the decorative item 16 is being raised to a desired position on the support structure 14 and allow for easy disengagement with the placement and retrieval apparatus 10 when the suspension apparatus 12 is placed in the desired position. It should be understood and appreciated that the placement portion 22 of the placement and retrieval apparatus 10 can have a slot cut anywhere therein to facilitate the placement of the suspension apparatus 12 in a desired location.

In another embodiment, the placement portion 22 of the placement and retrieval apparatus 10 includes a plurality of extension elements 32. It should be understood that the plurality of extension elements 32 can all include the upturned end 36 and the slot 42 disposed in the elbow 40 created by the upturned end 36.

In one embodiment, the retrieval portion 24 includes at least one rod element 44 that extends away from the base portion 34 of the placement and retrieval apparatus 10. In another embodiment, the retrieval portion 24 of the placement and retrieval apparatus 10 includes a plurality of rod elements 44 to engage the connection portion 20 of the suspension apparatus 12 to remove the suspension apparatus 12 from its placement on the support structure 14. The connection apparatus 20 of the suspension apparatus 12 can either be penetrated by one of the rod elements 44 of the retrieval portion 24 or it can be engaged by two or more of the rod elements 44. The rod elements 44 can extend from the base portion 34 at any angle desirable or extend straight from the base portion 34 at no angle.

In yet another embodiment of the present disclosure, the retrieval portion 24 of the placement and retrieval apparatus 10 includes at least three rod elements 44 that are disposed on the same plane. The two outer rod elements 44a and 44b having a desired angle between them such that the connection portion 20 of the suspension apparatus 12 is funneled between the outer two rod elements 44a and 44b to be penetrated by the other rod element(s) 44 or be caught between two or more rod elements 44. The connection portion 20 of the suspension apparatus 12, when penetrated by the rod elements 44 or engaged between rod elements 44, can then be pulled from its placement on the support structure 14 and reused in further decorating endeavors.

Figure 6:
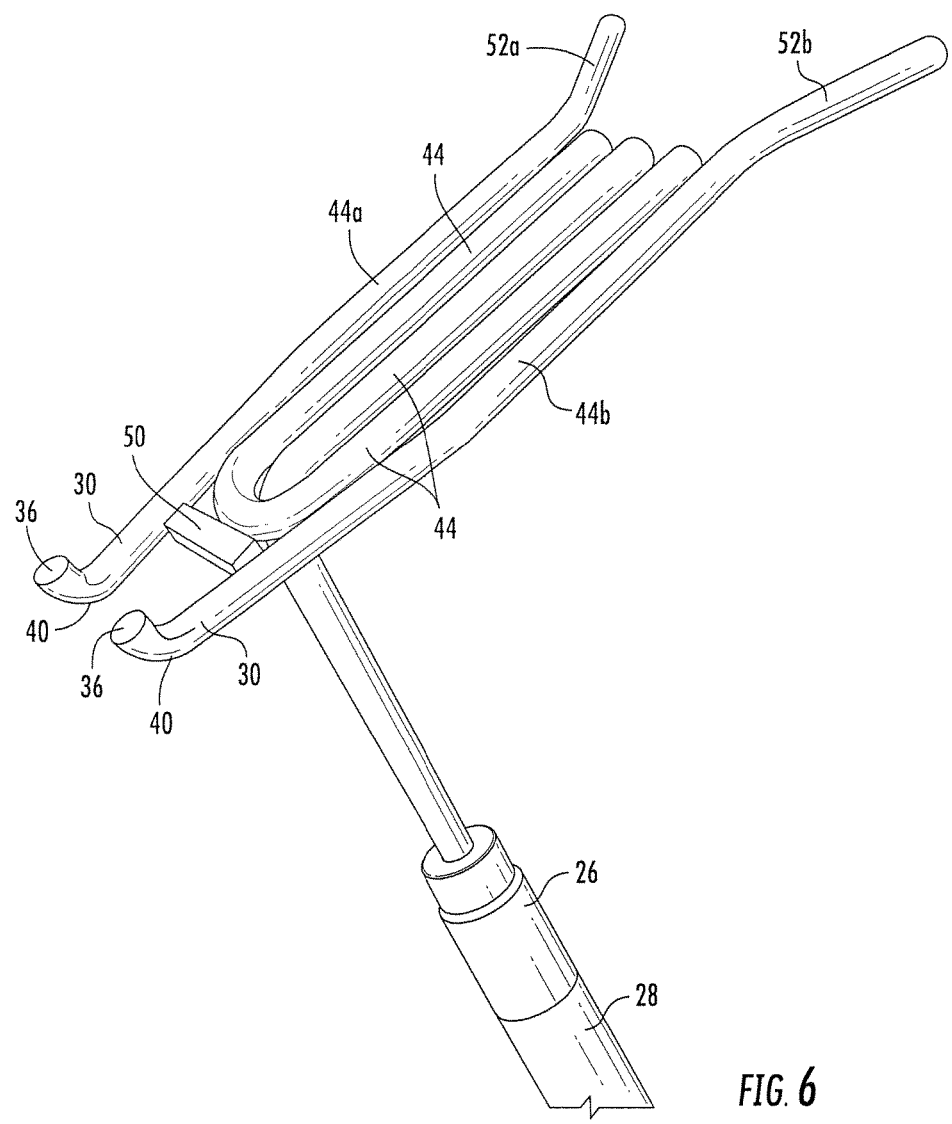
FIG. 6 is a perspective view of another embodiment of the placement and retrieval apparatus constructed in accordance with the present disclosure.

In another embodiment of the present disclosure, shown herein in FIG. 6, the placement and retrieval apparatus 10 can include a magnetic portion 50 for engaging the suspension apparatus 12 during placement of the suspension apparatus 12 in a desired location. In one embodiment, the magnetic portion 50 can be disposed adjacent to the base portion 34 and the extension elements 32 of the placement portion 22 of the placement and retrieval apparatus 10. In yet another embodiment shown in FIG. 6, the outer rod elements 44a and 44b can include angled portions 52a and 52b disposed on outer ends 54a and 54b of the outer rod elements 44a and 44b, respectively. The angled portions 52a and 52b can be angled outwardly such that the angled portions 52a and 52b funnel the connection portion 22 of the suspension apparatus 12 toward the other rod elements 44 disposed between the outer rod elements 44a and 44b. The outer rod elements 44a and 44b can be longer than the other rod elements 44 of the retrieval portion 24 of the placement and retrieval apparatus 10.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A placement and retrieval apparatus, the apparatus comprising:
    a placement portion for engaging a suspension apparatus to place the suspension apparatus at a desired location on a support structure; and
    a retrieval portion for engaging the suspension apparatus to remove the suspension apparatus from the support structure, the retrieval portion includes a first rod element extending straight away from a base portion of the placement and retrieval apparatus and a second rod element angled away from the base portion to engage a connection portion of the suspension apparatus to facilitate removal of the suspension apparatus from the support structure.

2. The apparatus of claim 1 further comprising an attachment element for attaching the placement and retrieval apparatus to a handle or pole.

3. The apparatus of claim 1 wherein the placement portion includes at least one rod element for supporting the suspension apparatus prior to placement of the suspension apparatus.

4. The apparatus of claim 3 wherein the at least one rod element of the placement portion has an upturned end that creates an elbow in the at least one rod element.

5. The apparatus of claim 4 where the elbow includes a slot for engaging a portion of the suspension apparatus to facilitate stabilization of the suspension apparatus during placement of the suspension apparatus.

6. The apparatus of claim 4 wherein the placement portion of the placement and retrieval apparatus further includes a magnetic portion for stabilizing the suspension apparatus during placement of the suspension apparatus.

7. The apparatus of claim 1 wherein the first and second rod elements create two outer rod elements and the two outer rod elements have an angled portion.

8. The apparatus of claim 7 wherein the angled portions of the outer rod elements are angled outward to funnel the connective portion of the suspension apparatus toward other rod elements disposed between the outer rod elements.

9. The apparatus of claim 8 wherein the outer rod elements are longer than the other rod elements of the placement and retrieval apparatus.

\* \* \* \* \*